(12) United States Patent
Lewis et al.

(10) Patent No.: US 11,306,886 B2
(45) Date of Patent: Apr. 19, 2022

(54) LIGHT FIXTURE

(71) Applicant: Hubbell Incorporated, Shelton, CT (US)

(72) Inventors: Randy Lewis, Greenville, SC (US); John Hollander, Greenville, SC (US); Stephen Kiff, Greenville, SC (US)

(73) Assignee: Hubbell Lighting, Inc., Shelton, CT (US)

( * ) Notice: Subject to any disclaimer, the term of this patent is extended or adjusted under 35 U.S.C. 154(b) by 0 days.

(21) Appl. No.: 16/825,562

(22) Filed: Mar. 20, 2020

(65) Prior Publication Data

US 2020/0300429 A1   Sep. 24, 2020

Related U.S. Application Data

(60) Provisional application No. 62/821,165, filed on Mar. 20, 2019.

(51) Int. Cl.
*F21S 8/02* (2006.01)
*F21V 8/00* (2006.01)
*F21Y 115/10* (2016.01)

(52) U.S. Cl.
CPC ............ *F21S 8/026* (2013.01); *G02B 6/0051* (2013.01); *G02B 6/0055* (2013.01); *F21Y 2115/10* (2016.08)

(58) Field of Classification Search
CPC .......... F21S 8/026; F21V 7/05; G02B 6/0051; G02B 6/0055
See application file for complete search history.

(56) References Cited

U.S. PATENT DOCUMENTS

| | | | | |
|---|---|---|---|---|
| 6,161,939 A | * | 12/2000 | Bansbach | F21S 8/061 362/223 |
| 9,645,303 B2 | * | 5/2017 | Tarsa | G02B 6/009 |
| D796,104 S | * | 8/2017 | Blankenship | D26/74 |
| 10,337,677 B1 | * | 7/2019 | Sinai | G02F 1/133605 |
| 2011/0176306 A1 | * | 7/2011 | Kim | F21S 8/026 362/235 |
| 2012/0106194 A1 | | 5/2012 | Ashoff et al. | |

(Continued)

OTHER PUBLICATIONS

PCT/US2020/023915 International Search Report and Written Opinion dated Jun. 16, 2020 (18 pages).

*Primary Examiner* — Leah Simone Macchiarolo
(74) *Attorney, Agent, or Firm* — Michael Best & Friedrich LLP (57) ABSTRACT

A light fixture includes a housing configured to be secured to a support surface, a plurality of light emitters supported on the housing, and a pair of panels supported on the housing. The housing includes a first end, a second end, a pair of sides extending between the first end and the second end, and an intermediate portion positioned between the pair of sides and oriented in a direction substantially parallel to a longitudinal axis. The housing includes a light emission opening through which light is directed. The panels are positioned on opposite sides of the intermediate portion from one another. Each of the panels is oriented in an inclined plane relative to the light emission opening. Each of the panels includes an outer edge positioned adjacent one of the sides of the housing, and an inner edge positioned adjacent the intermediate portion.

20 Claims, 9 Drawing Sheets

(56) References Cited

U.S. PATENT DOCUMENTS

| | | | |
|---|---|---|---|
| 2012/0287671 A1* | 11/2012 | Parker | F21S 2/005 |
| | | | 362/609 |
| 2013/0083559 A1* | 4/2013 | Oh | G09F 13/18 |
| | | | 362/612 |
| 2014/0313776 A1* | 10/2014 | Grigore | G02B 6/0078 |
| | | | 362/612 |
| 2016/0377275 A1 | 12/2016 | Lim et al. | |
| 2017/0082252 A1 | 3/2017 | Casement et al. | |
| 2017/0303357 A1* | 10/2017 | Miller | H05B 45/00 |
| 2018/0267232 A1 | 9/2018 | Clements | |

* cited by examiner

LIGHT FIXTURE

REFERENCE TO RELATED APPLICATION

This application claims the benefit of prior-filed U.S. Provisional Application No. 62/821,165, filed. Mar. 20, 2019, the entire contents of which are incorporated by reference.

FIELD

The present disclosure relates to light fixtures, and particularly to a recessed light fixture.

SUMMARY

In one independent aspect, a light fixture includes a housing configured to be secured to a support surface, a plurality of light emitters supported on the housing, and a pair of panels supported on the housing. The housing includes a first end, a second end, and a longitudinal axis extending between the first end and the second end. The housing further includes a pair of sides extending between the first end and the second end, and an intermediate portion positioned between the pair of sides and oriented in a direction substantially parallel to the longitudinal axis. The housing includes a light emission opening through which light is directed. The panels are positioned on opposite sides of the intermediate portion from one another. Each of the panels is oriented in an inclined plane relative to the light emission opening. Each of the panels includes an outer edge and an inner edge. The outer edge is positioned adjacent an associated one of the sides of the housing, and the inner edge is positioned adjacent the intermediate portion.

In another independent aspect, a light fixture includes a housing configured to be secured to a support surface, a plurality of light emitters supported on the housing, a first panel supported on the housing, and a second panel supported on the housing. The housing includes a first end, a second end, and a longitudinal axis extending between the first end and the second end. The housing further includes a first side, a second side, and an intermediate portion. The first side and the second side are oriented parallel to one another and extend between the first end and the second end. The intermediate portion is positioned between the first side and the second side, and the intermediate portion is oriented in a direction substantially parallel to the longitudinal axis. The housing includes a light emission opening through which light is directed away from the housing. The first panel is positioned between the first end, the second end, the first side, and the intermediate portion. The first panel is oriented in a first inclined plane relative to the light emission opening. The second panel is supported on the housing and positioned between the first end, the second end, the second side, and the intermediate portion. The second panel is oriented in a second inclined plane relative to the light emission opening.

In yet another independent aspect, a recessed light fixture includes a housing, a plurality of light emitters supported on the housing, a first planar optic supported on the housing, and a second planar optic supported on the housing. The housing is configured to be secured to a support surface in a recessed position. The housing includes: a first end and a second end opposite the first end, a longitudinal axis extending between the first end and the second end, a first side and a second side parallel to and laterally spaced apart from the first side, the first side and the second side extending between the first end and the second end, a terminal surface extending around a light emission opening through which light is directed from the housing, the terminal surface defining an opening plane and positioned substantially flush with the support surface, and an intermediate portion positioned between the first side and the second side, the intermediate portion oriented substantially parallel to the longitudinal axis. The first planar optic extends between the first end and the second end. The first planar optic is positioned between the first side and the intermediate portion and oriented in a first inclined plane. An edge of the first planar optic adjacent the intermediate portion is positioned closer to the light emission opening than another edge of the first planar optic adjacent the first side of the housing. The second planar optic extends between the first end and the second end. The second planar optic is positioned between the second side and the intermediate portion, and oriented in a second inclined plane. An edge of the second planar optic adjacent the intermediate portion is positioned closer to the light emission opening than another edge of the second planar optic adjacent the second side of the housing.

Other aspects of the disclosure will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

The present disclosure relates to a recessed light fixture including two or more planar optics, such as LED edge-lit panels, that are inclined relative to a housing. In the illustrated embodiment, the planar optics are positioned on either side of the housing and separate by an intermediate portion.

Figure 1:
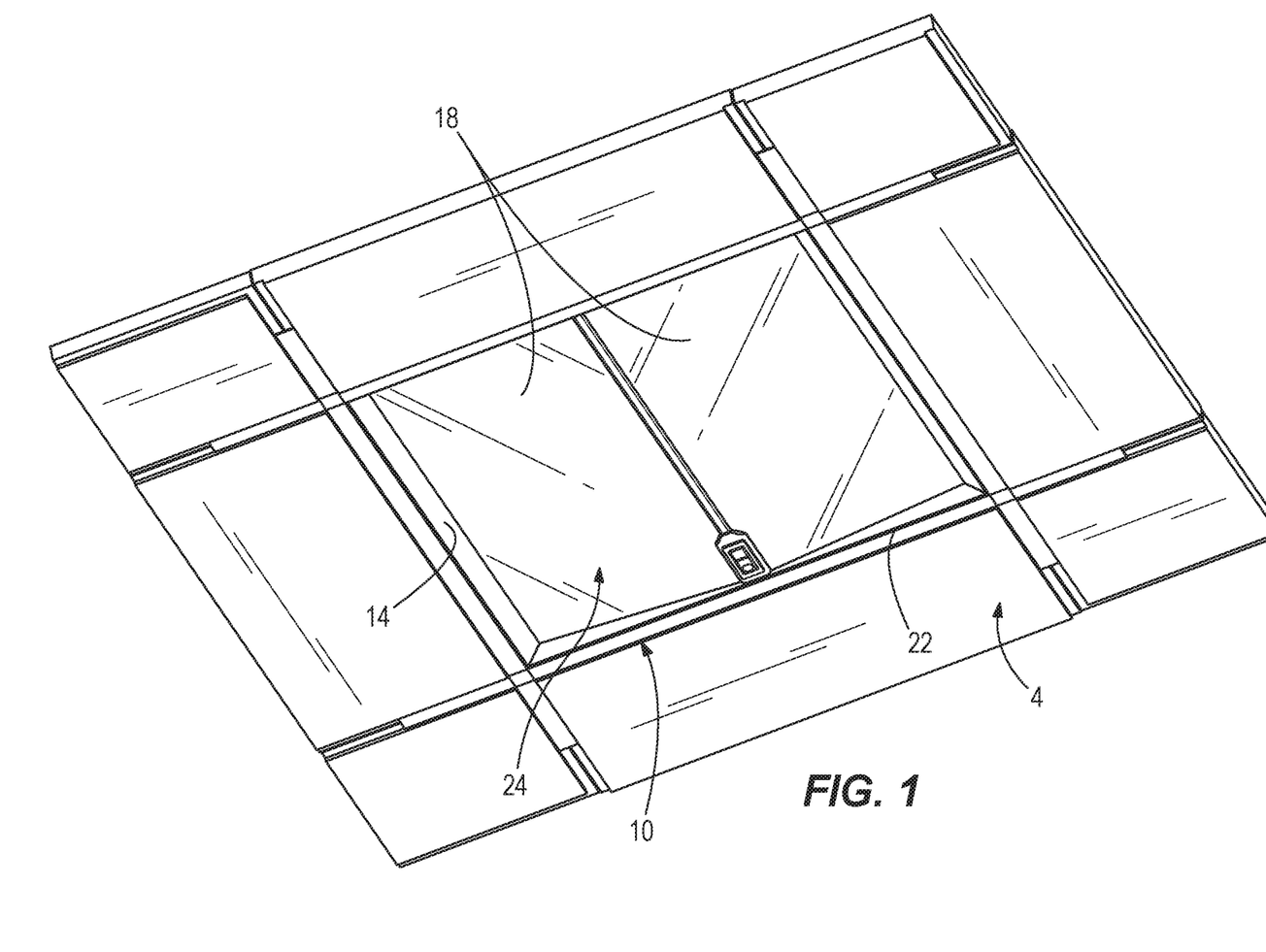
FIG. 1 is a perspective view of a light fixture positioned in a ceiling.
Figure 2:
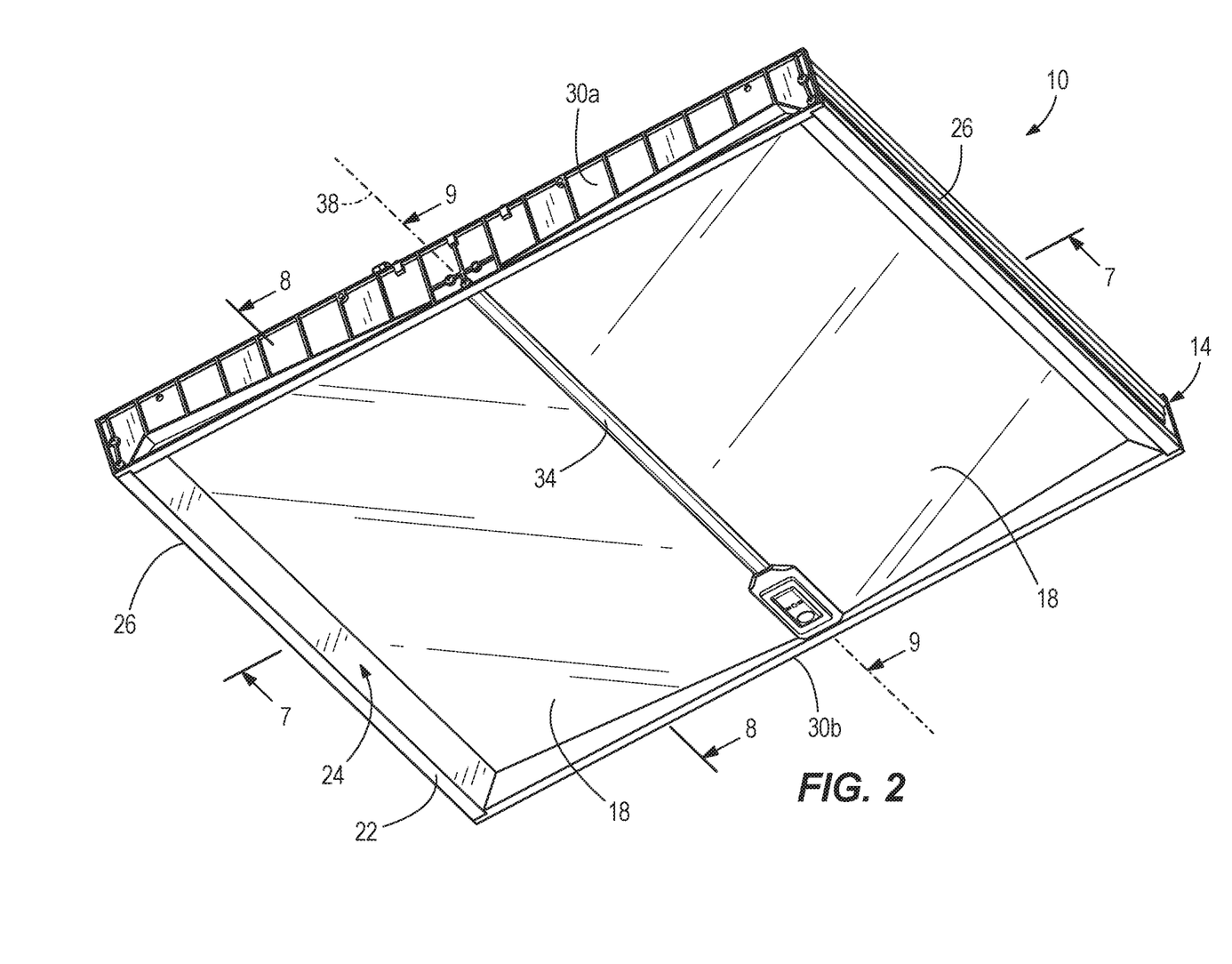
FIG. 2 is a perspective view of the light fixture of FIG. 1.

As shown in FIGS. 1 and 2, a light fixture 10 includes a frame or housing 14 and light emitting surfaces 18. In the illustrated embodiment, the housing 14 has a rectangular or square shape and is supported in a recessed position relative to a ceiling 4 (FIG. 1) such that a terminal surface 22 of the housing 14 is substantially flush with the ceiling. The light emitting surfaces 18 direct light output through a light emission opening 24. In the illustrated embodiment, the light emission opening 24 is positioned adjacent the terminal surface 22 and is bound by the perimeter of the housing 14. In some embodiments, the housing 14 may be sized to fit within a 2 ft. by 2 ft. square recess; in other embodiments, the housing 14 may have different dimensions (e.g., 1 ft. by 2 ft.; 1 ft. by 4 ft.; 2 ft. by 4 ft.; etc.).

Referring to FIG. 2, the housing 14 includes a pair of sides 26, a pair of ends 30 (first end 30a and second end 30b), and an intermediate portion 34 positioned between and parallel to the sides 26. In the illustrated embodiment, a longitudinal axis 38 of the housing 14 extends between the first end 30a and the second end 30b, and the intermediate portion 34 is centrally aligned with the longitudinal axis 38. Also, in the illustrated embodiment, the sides 26 and the intermediate portion 34 are formed by one or more extrusion processes.

Figure 7:
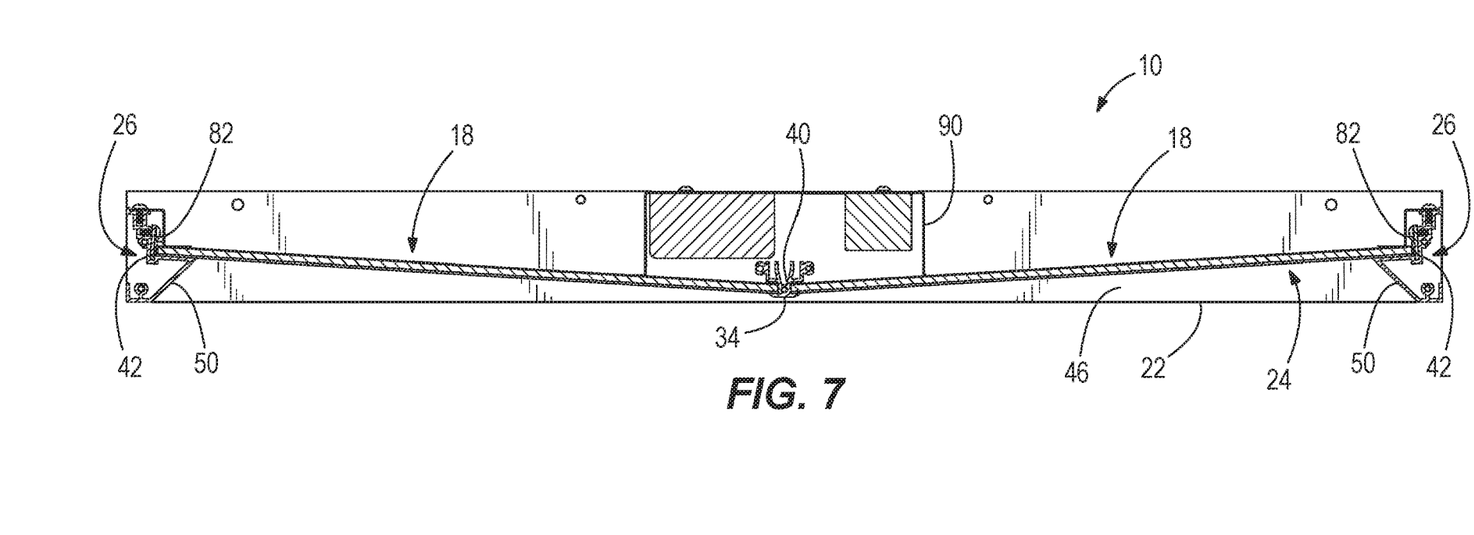
FIG. 7 is a section view of the light fixture of FIG. 1, viewed along section 7-7.

Each light emitting surface 18 is formed as an edge-lit planar panel 18 that is supported in the housing 14. In the illustrated embodiment, the light fixture 10 includes two panels 18 positioned on opposite sides of the intermediate portion 34. As best shown in FIG. 7, each of the panels 18 is mounted in an inclined orientation relative to the light emission opening 24 (that is, relative to a plane formed by the terminal surface 22 of the housing 14), and one edge of each panel 18 is positioned closer to the terminal surface 22 than an opposite edge of the panel. In some embodiments, each panel 18 is oriented at an inclined angle, and the inclined angle between approximately zero degrees and approximately fifteen degrees. In some embodiments, the inclined angle is between approximately zero degrees and approximately ten degrees. In some embodiments, the inclined angle is between approximately zero degrees and approximately five degrees.

In the illustrated embodiment, the panels 18 are inclined between the sides 26 of the housing 14 and the intermediate portion 34. The inner edges 40 of the panel 18 that are adjacent the intermediate portion 34 are positioned closer to the terminal surface 22 than outer edges 42 of the panels 18 that are positioned adjacent respective sides 26 of the housing 14. Stated another way, when the housing 14 is supported within a substantially horizontal ceiling, the inner edges 40 are positioned lower than the outer edges 42. In addition, the inner edges 40 are spaced apart from the terminal surface 22. In other embodiments, the panels 18 may be inclined in a different manner.

Figure 3:
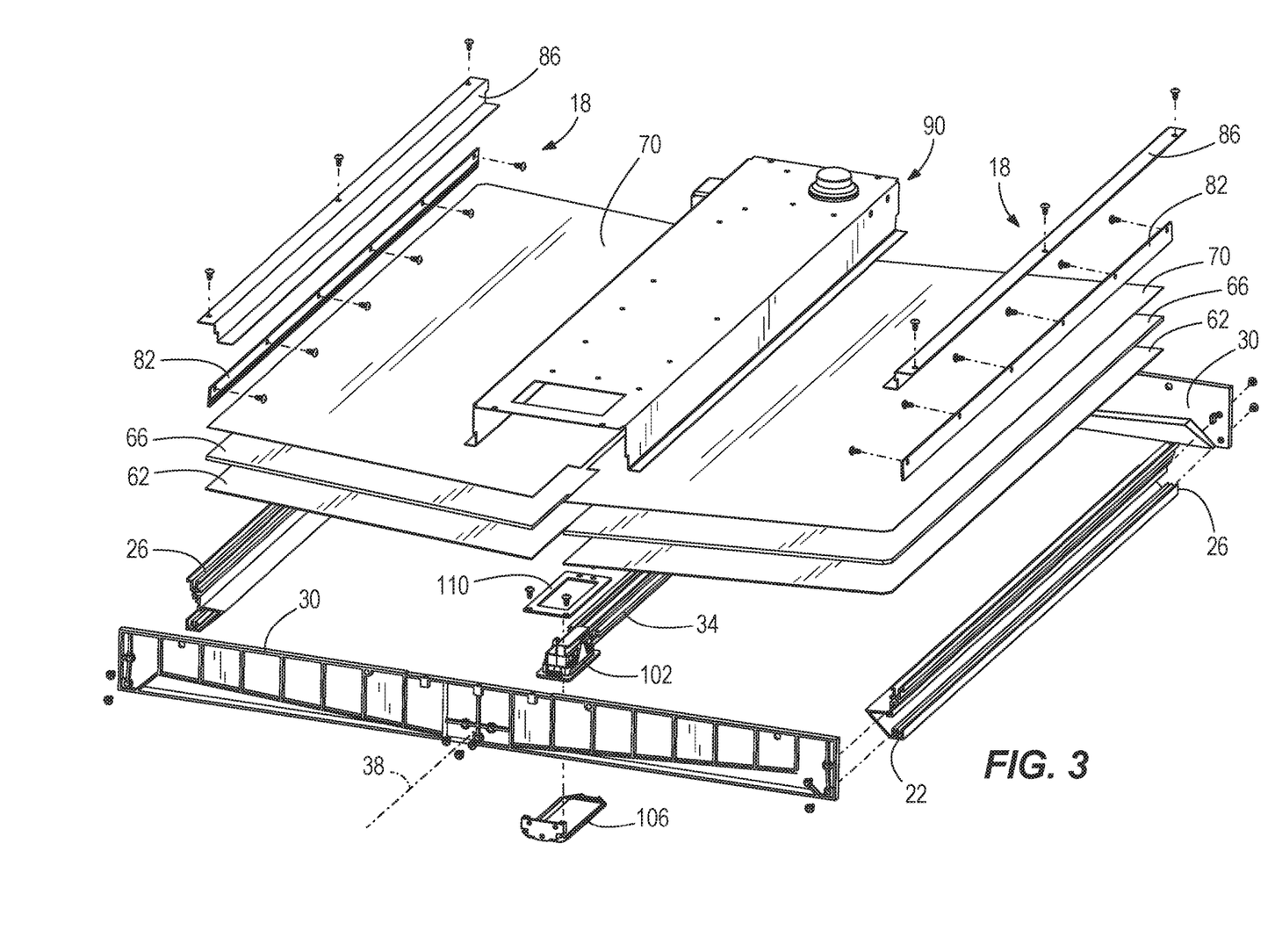
FIG. 3 is an exploded view of the light fixture of FIG. 1.
Figure 5:
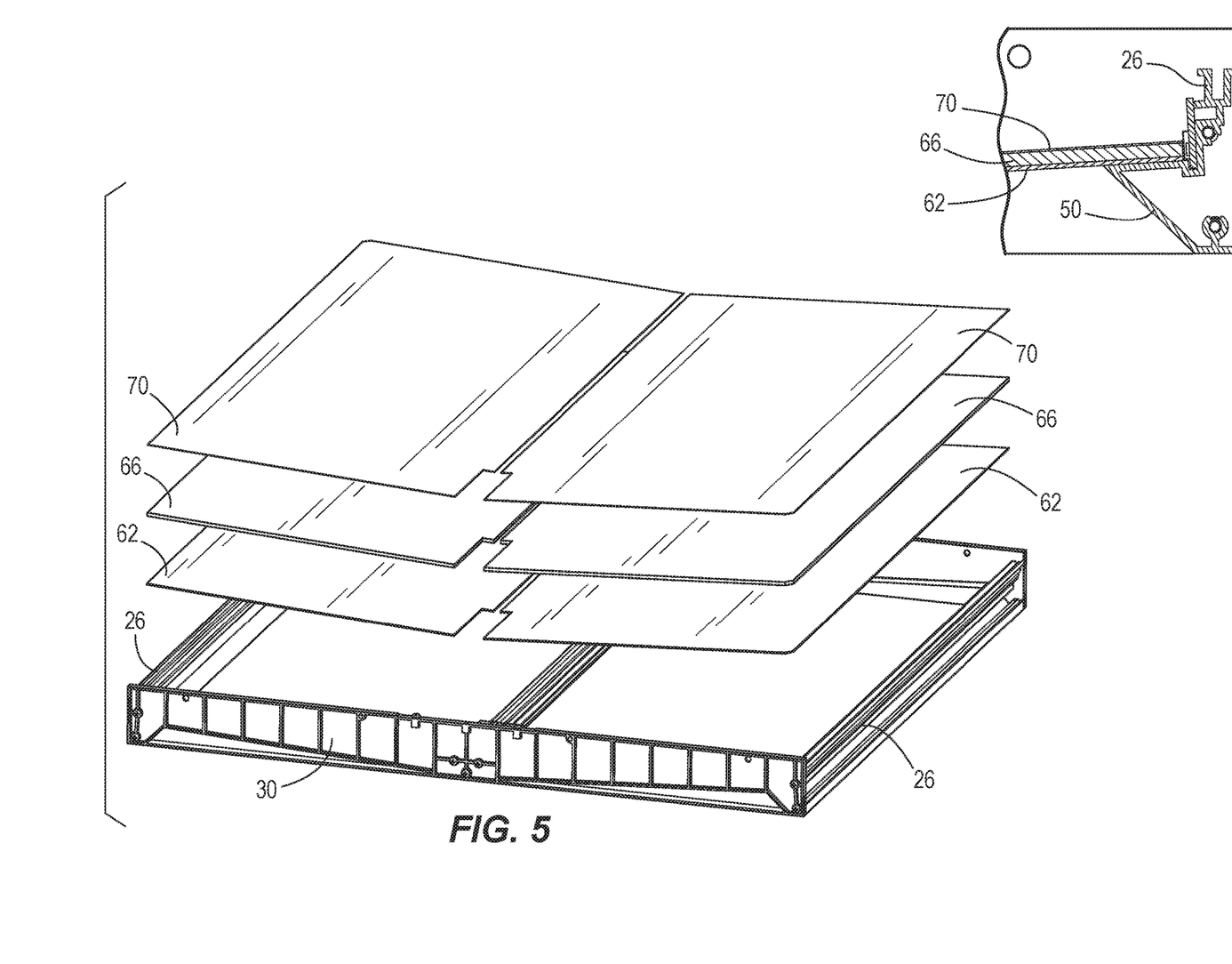
FIG. 5 is an exploded view of a portion of the light fixture of FIG. 1.

As shown in FIGS. 3 and 5, in the illustrated embodiment each panel 18 includes a diffuser 62, a light guide 66, and a reflector 70. The diffuser 62, the light guide 66, and the reflector 70 are layered with respect to one another. The diffuser 62 is positioned proximate the terminal surface 22 of the fixture 10, and the light guide 66 is positioned between the diffuser 62 and the reflector 70. In other embodiments, each panel 18 may include only a reflector and a light guide, or may simply include a light guide.

Figure 6:
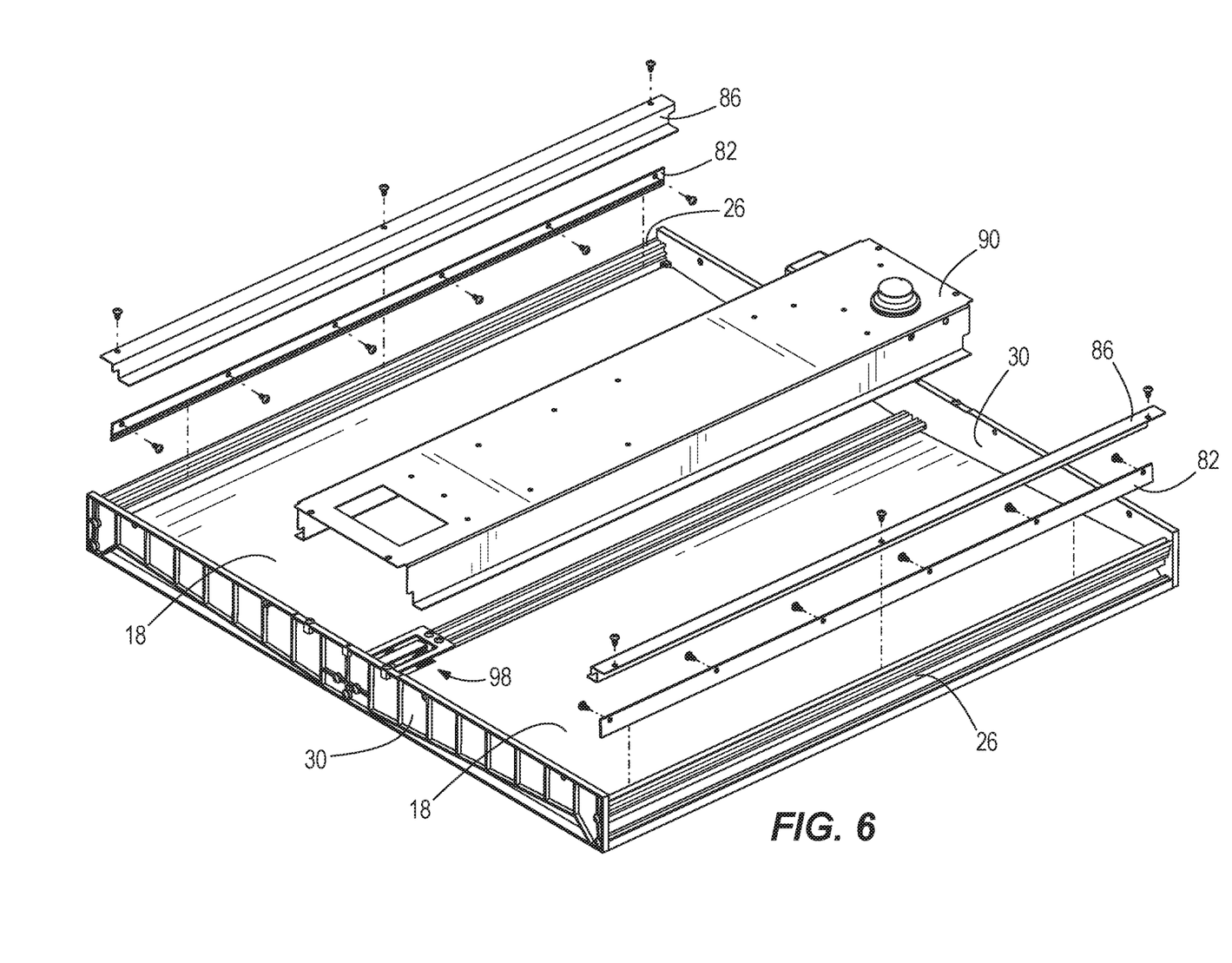
FIG. 6 is a partially exploded view of the light fixture of FIG. 1.

In addition, as shown in FIGS. 3 and 6, light sources or light emitters 82 are positioned along at least one edge of each panel 18, and the light from the light emitters 82 is directed from the panel 18 through the light emission opening 24. The light emitters 82 include light boards supporting a plurality of light emitting diodes (LEDs). The LEDs are generally aligned with one another in a linear manner along the associated edge of the panel 18. In some embodiments, a cover 86 is positioned over the light emitters 82. In the illustrated embodiment, the light emitters 82a, 82b are supported on the sides 26 of the housing 14, with a first set of light emitters 82a positioned adjacent an outer edge 42 of one panel 18 and a second set of light emitters 82b positioned adjacent an outer edge 42 of the other panel 18. In other embodiments, light emitters 82 can be supported on the intermediate portion 34 and positioned adjacent the inner edges 40 of the panels 18.

Figure 4:
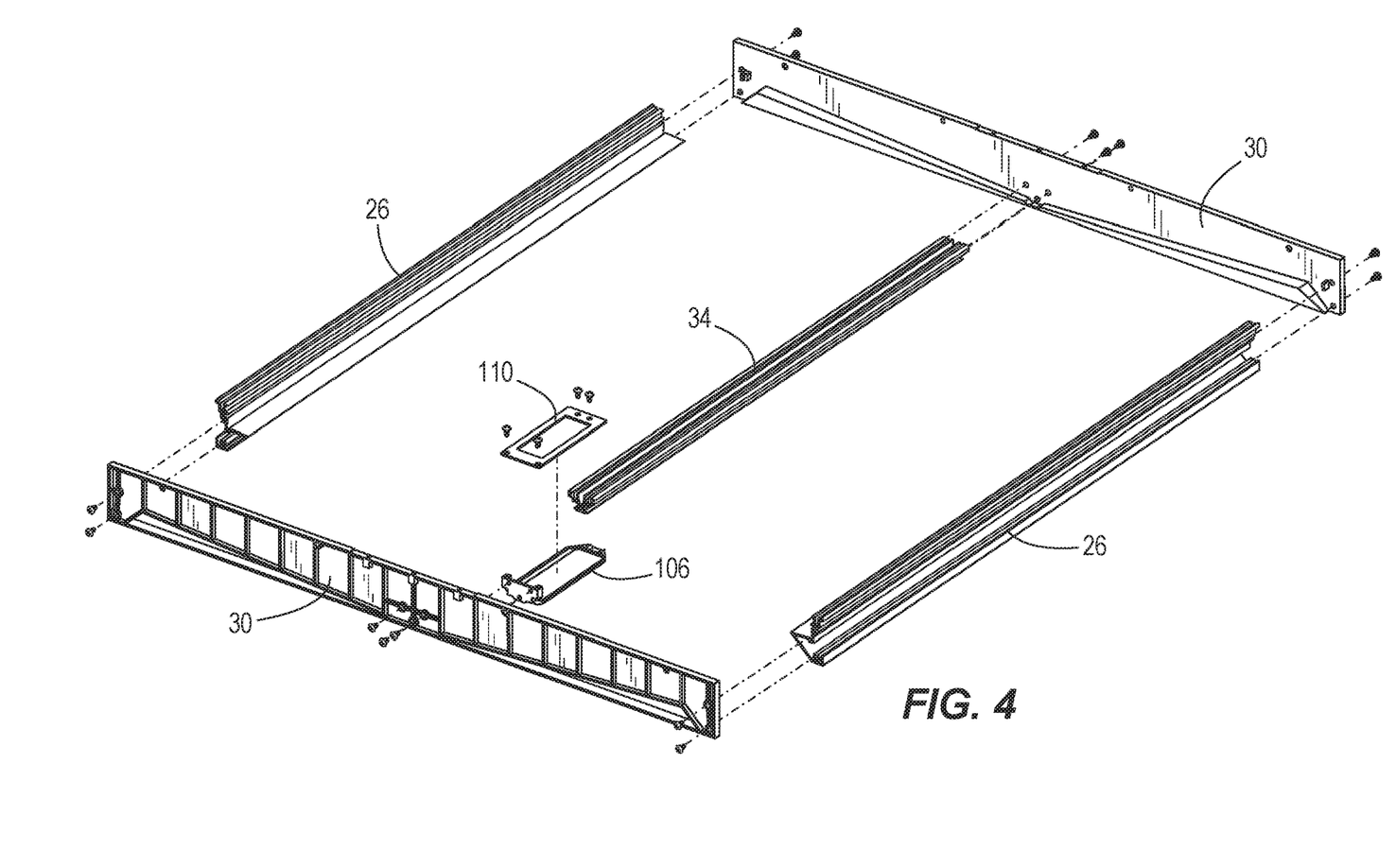
FIG. 4 is an exploded view of a portion of the light fixture of FIG. 1.
Figure 8:
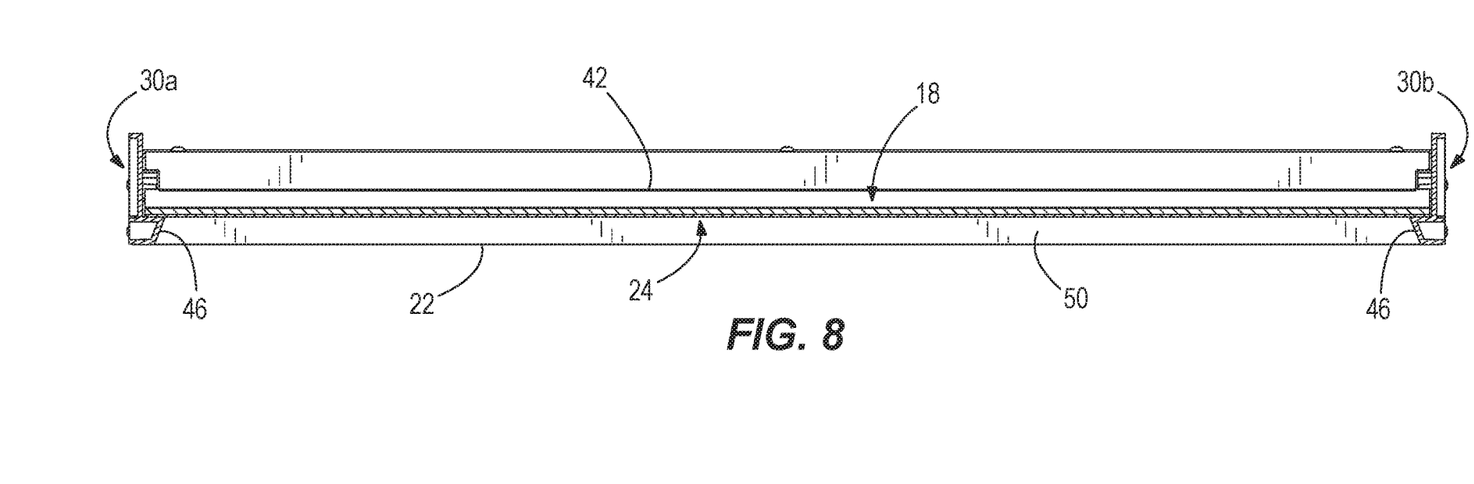
FIG. 8 is a section view of the light fixture of FIG. 1, viewed along section 8-8.
Figure 9:
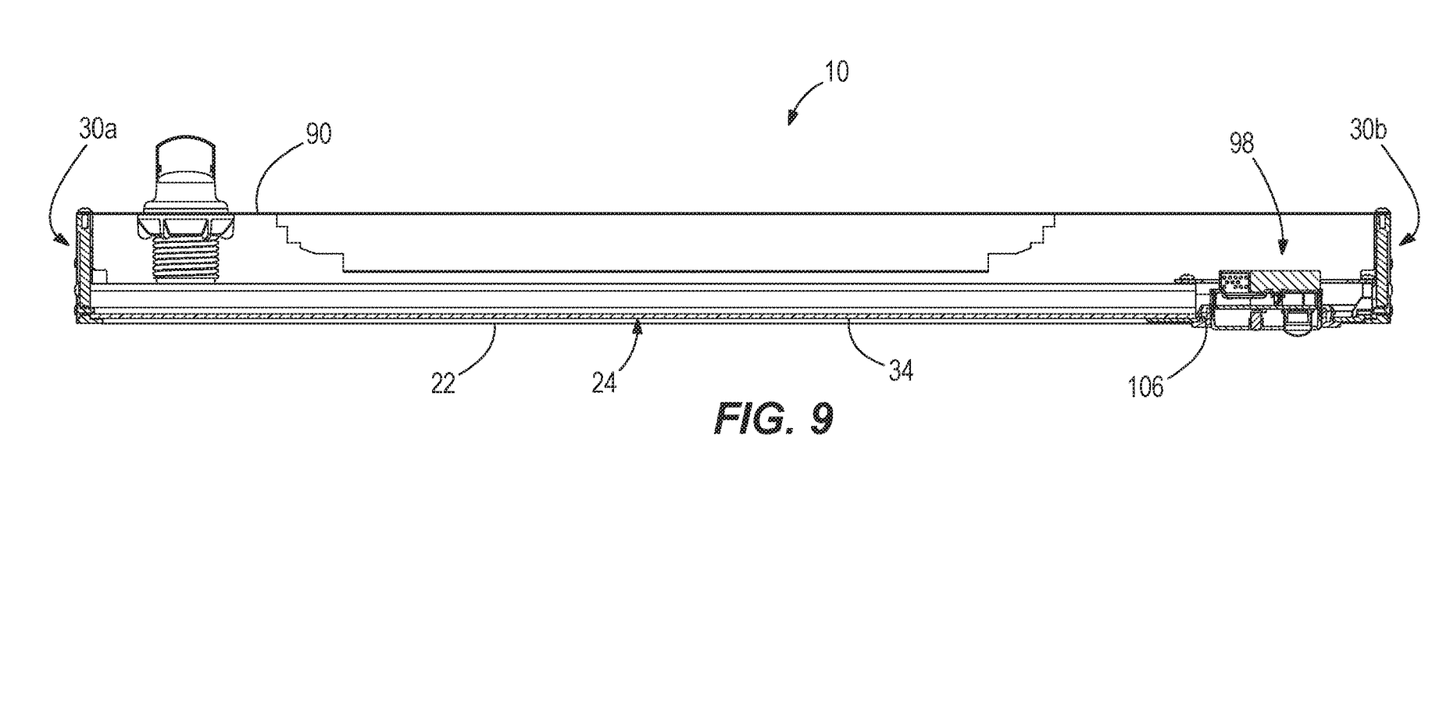
FIG. 9 is a section view of the light fixture of FIG. 1, viewed along section 9-9.

The ends 30 of the housing 14 includes internal end walls 46 that are positioned adjacent the edges of panels 18, and the sides 26 include internal side walls 50 that are positioned adjacent the outer sides of the panels 18. As best shown in FIGS. 4 and 6, the internal side walls 50 are inclined inwardly from the terminal surface 22 toward the longitudinal axis 38 and toward a surface of the associated panel 18. Similarly, as best shown in FIG. 8, the internal end walls 46 are inclined inwardly from the terminal surface 22 toward the panels 18. Due to the inclined orientation of the panels 18, the internal end walls 46 have a depth that varies along the width of the fixture 10 (i.e., in a direction transverse to the center longitudinal axis 38).

Referring now to FIG. 6, the fixture 10 further includes associated electrical components, such as drivers, controllers, etc. for operating the light emitters 82 in the illustrated embodiment, an enclosure 90 is positioned above the intermediate portion 34 and extend substantially along a length of the intermediate portion 34. In addition, as shown in FIGS. 3 and 4, the fixture 10 includes a support 98 and a sensor 102 supported by the support 98. In the illustrated embodiment, the support 98 is positioned between one of the ends 30 and an end of the intermediate portion 34. The sensor support 98 includes a sensor housing 106, and a bracket 110 coupled to the sensor housing 106. The sensor housing 106 engages the end of the intermediate portion 34 (e.g., by a hook or tab received within a slot on the intermediate portion 34). In other embodiments, the support 98 may support an emergency battery test switch, either in addition to or instead of the sensor 102.

Figure 10:
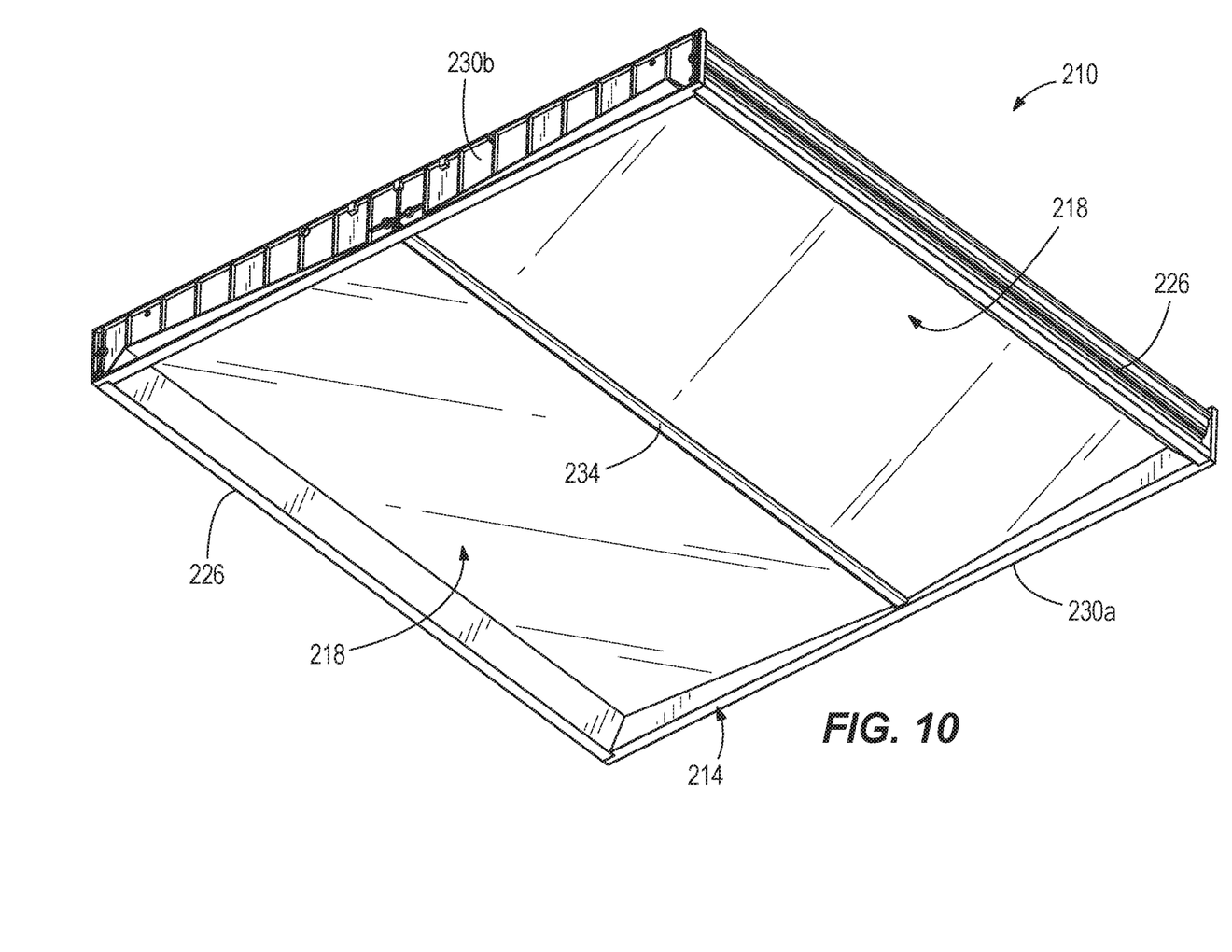
FIG. 10 is side view of a light fixture according to another embodiment.

In other embodiments, as shown in FIG. 10, the fixture 210 may be constructed without a sensor support. In the embodiment shown in FIG. 10, an intermediate portion 234 extends between a first end 230a and a second end 230b of a housing 214. For clarity, features of fixture 210 that are similar to features of fixture 10 are identified with similar reference numbers, plus 200.

Although various aspects have been described in detail with reference to certain embodiments, variations and modifications exist within the scope and spirit of one or more independent aspects as described. Various features and advantages are set forth in the following claims.

What is claimed is:

1. A light fixture comprising:
   a housing configured to be secured to a support surface, the housing including a first end wall, a second end wall, and a longitudinal axis extending between the first end wall and the second end wall, the housing further including a pair of sides extending between the first end wall and the second end wall to form a rectangular perimeter, and an intermediate portion positioned between the pair of sides and oriented in a direction substantially parallel to the longitudinal axis, the intermediate portion spaced apart from the support surface, the housing including a light emission opening through which light is directed;
a plurality of light emitters supported on the housing; and
a pair of panels supported on the housing, the panels positioned on opposite sides of the intermediate portion from one another, each of the panels oriented in an inclined plane relative to the light emission opening, each of the panels including an outer edge and an inner edge, the outer edge positioned adjacent an associated one of the sides of the housing, the inner edge positioned adjacent the intermediate portion, each of the panels having a first end and a second end, the first end engaging the first end wall of the housing, the second end engaging the second end wall of the housing.

2. The light fixture of claim 1, wherein the panels are positioned symmetrically about the longitudinal axis with respect to one another.

3. The light fixture of claim 1, wherein the panels are oriented such that the inner edge of each panel is positioned closer to the light emission opening than the outer edge.

4. The light fixture of claim 1, wherein the panels are inclined at an angle relative to a plane defined by a perimeter of the light emission opening.

5. The light fixture of claim 1, wherein the panels are oriented such that the inner edge of each panel is parallel to the longitudinal axis and the outer edge of each panel is parallel to the longitudinal axis.

6. The light fixture of claim 1, wherein the plurality of light emitters includes a first set of light emitters and a second set of light emitters, the first set of light emitters supported on one of the sides of the housing and positioned adjacent the outer edge of one of the panels, the second set of light emitters supported on the other of the sides of the housing and positioned adjacent the outer edge of other of the panels.

7. The light fixture of claim 1, wherein the housing is supported in a recessed position relative to a ceiling structure such that a perimeter of the light emission opening is substantially flush with the ceiling structure.

8. The light fixture of claim 1, wherein each of the panels has a layered construction including at least a light guide and a reflector.

9. The light fixture of claim 1, further comprising a support member and a sensor, the support member engaging an end of the intermediate portion, the support member positioned between the end of intermediate portion and one of the first end wall and the second end wall of the housing.

10. The light fixture of claim 1, wherein inclined interior surfaces are formed on each of the first end wall, the second end wall, and the pair of sides, the inclined interior surfaces extending between the pair of panels and the light emission opening, the interior surfaces oriented at an angle relative to a plane defined by a perimeter of the light emission opening.

11. A light fixture comprising:
a housing configured to be secured to a support surface, the housing including a first end wall, a second end wall, and a longitudinal axis extending between the first end wall and the second end wall, the housing further including a first side, a second side, and an intermediate portion, the first side and the second side oriented parallel to one another and extending between the first end wall and the second end wall to form a rectangular perimeter, the intermediate portion positioned between the first side and the second side, the intermediate portion oriented in a direction substantially parallel to the longitudinal axis, the intermediate portion spaced apart from the support surface, the housing including a light emission opening through which light is directed away from the housing;
a plurality of light emitters supported on the housing;
a first panel supported on the housing and positioned between the first end wall, the second end wall, the first side, and the intermediate portion, the first panel oriented in a first inclined plane relative to the light emission opening, the first panel having a first end and a second end, the first end engaging the first end wall of the housing, the second end engaging the second end wall of the housing; and
a second panel supported on the housing and positioned between the first end wall, the second end wall, the second side, and the intermediate portion, the second panel oriented in a second inclined plane relative to the light emission opening, the second panel having a first end and a second end, the first end of the second panel engaging the first end wall of the housing, the second end of the second panel engaging the second end wall of the housing.

12. The light fixture of claim 11, wherein the panels are positioned symmetrically about the longitudinal axis with respect to one another.

13. The light fixture of claim 11, wherein an edge of the first panel adjacent the intermediate portion is positioned closer to the light emission opening than another edge of the first panel adjacent the first side of the housing.

14. The light fixture of claim 11, wherein the first inclined plane is oriented at an angle relative to a plane defined by a perimeter of the light emission opening.

15. The light fixture of claim 11, wherein the plurality of light emitters includes a first set of light emitters and a second set of light emitters, the first set of light emitters supported on the first side of the housing and positioned adjacent an edge of the first panel, the second set of light emitters supported on the second side of the housing and positioned adjacent an edge of the second panel.

16. The light fixture of claim 11, wherein the housing is supported in a recessed position relative to a ceiling structure such that a perimeter of the light emission opening is substantially flush with the ceiling structure.

17. The light fixture of claim 11, wherein each of the first panel and the second panel has a layered construction, the first panel and the second panel each including at least a light guide and a reflector.

18. A recessed light fixture comprising:
a housing configured to be secured to a support surface in a recessed position relative to a ceiling structure, the housing including,
a first end wall and a second end wall opposite the first end wall, a longitudinal axis extending between the first end wall and the second end wall,
a first side and a second side parallel to and laterally spaced apart from the first side, the first side and the second side extending between the first end wall and the second end wall to form a rectangular perimeter,
a terminal surface extending around a light emission opening through which light is directed from the housing, the terminal surface defining an opening plane and positioned substantially flush with the ceiling structure,
a recessed surface spaced apart from the terminal surface and having substantially the same profile as the terminal surface, the recessed surface oriented in a plane that is recessed with respect to the ceiling structure, and an intermediate portion positioned between the first side and the second side, the intermediate portion offset from the plane of the recessed surface and oriented substantially parallel to the longitudinal axis;

a plurality of light emitters supported on the housing;

a first planar optic supported on the housing and extending between the first end wall and the second end wall, the first planar optic positioned between the first side and the intermediate portion, the first planar optic oriented in a first inclined plane, an edge of the first planar optic adjacent the intermediate portion positioned closer to the light emission opening than another edge of the first planar optic adjacent the first side of the housing, the first planar optic having a first end and a second end, the first end engaging the first end wall of the housing, the second end engaging the second end wall of the housing; and a second planar optic supported on the housing and extending between the first end wall and the second end wall, the second planar optic positioned between the second side and the intermediate portion, the second planar optic oriented in a second inclined plane, an edge of the second planar optic adjacent the intermediate portion positioned closer to the light emission opening than another edge of the second planar optic adjacent the second side of the housing, the second planar optic having a first end and a second end, the first end of the second planar optic engaging the first end wall of the housing, the second end of the second planar optic engaging the second end wall of the housing.

19. The light fixture of claim 18, wherein the plurality of light emitters includes a first set of light emitters and a second set of light emitters, the first set of light emitters supported on the first side of the housing and positioned adjacent an edge of the first planar optic, the second set of light emitters supported on the second side of the housing and positioned adjacent an edge of the second planar optic.

20. The light fixture of claim 18, wherein each of the first planar optic and the second panel has a layered construction, the first planar optic and the second planar optic each including a diffuser proximate the light emission opening, a reflector, and a light guide positioned between the diffuser and the reflector.

* * * * *